US008042190B2

(12) United States Patent
Sahita et al.

(10) Patent No.: US 8,042,190 B2
(45) Date of Patent: Oct. 18, 2011

(54) PRE-BOOT PROTECTED MEMORY CHANNEL

(75) Inventors: Ravi Sahita, Beaverton, OR (US); Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 11/967,293

(22) Filed: Dec. 31, 2007

(65) Prior Publication Data

US 2009/0172822 A1 Jul. 2, 2009

(51) Int. Cl.
H04L 9/00 (2006.01)
H04L 9/32 (2006.01)
G06F 12/04 (2006.01)

(52) U.S. Cl. ............... 726/27; 726/28; 726/29; 726/30; 713/187; 713/188; 713/189; 713/190; 713/191

(58) Field of Classification Search ............ 726/27
See application file for complete search history.

(56) References Cited

U.S. PATENT DOCUMENTS

| | | | |
|---|---|---|---|
| 6,718,401 B2 * | 4/2004 | Nalawadi et al. ............ 710/13 |
| 7,103,771 B2 | 9/2006 | Grawrock | |
| 2005/0251867 A1 * | 11/2005 | Sastry et al. ................ 726/34 |
| 2007/0006175 A1 | 1/2007 | Durham et al. | |

OTHER PUBLICATIONS

Smith, Ned M. et al. "Methods and Apparatus for Providing Upgradeable Key Bindings for Trusted Platform Modules" United States Patent Application filed Sep. 27, 2007; U.S. Appl. No. 11/863,233.

Smith, Ned M. et al. "Methods and Apparatus for Creating an Isolated Partition for a Virtual Trusted Platform Module" United States Patent Application filed Aug. 10, 2007; U.S. Appl. No. 11/837,378.

Smith, Ned M. et al. "Device, System, and Method for Provisioning Trusted Platform Module Policies to a Virtual Machine Monitor" United States Patent Application filed Nov. 15, 2007; U.S. Appl. No. 11/984,321.

Brutch, Tasneem et al. "Virtual TPM Keys Rooted in a Hardwared TPM" United States Patent Application filed Sep. 28, 2007; U.S. Appl. No. 11/864,512.

Brutch, Tasneem et al. "Method and Apparatus for Allowing Access to Hardware TPM to a Trusted Virtual Machine When the TPM is Virtualized" United States Patent Application filed Dec. 21, 2007; U.S. Appl. No. 11/963,336.

Smith, Ned M. "Method and Apparatus for Virtualization of a Multi-Context Hardware Trusted Platform Module (TPM)" United States Patent Application filed filed Aug. 22, 2007; U.S. Appl. No. 11/894,915.

* cited by examiner

*Primary Examiner* — Longbit Chai
(74) *Attorney, Agent, or Firm* — Schwabe, Williamson & Wyatt, P.C.

(57) ABSTRACT

Machine readable media, methods, and computing devices are disclosed which establish a protected memory channel between an operating system loader of a user partition and services of a management partition. One computing device includes protected storage, read only memory, firmware, a storage device and a processor. The storage device is to store the virtual machine monitor and an operating system having an operating system loader. The virtual machine monitor is to establish a protected memory channel between the one or more integrity services of a management partition and the operating system loader of a user partition in response to measuring and verifying the operating system loader based upon the manifest. The processor is to execute the code of the read only memory, the firmware, the virtual machine monitor, the operating system, the operating system loader, the management partition, and the user partition.

20 Claims, 5 Drawing Sheets

PRE-BOOT PROTECTED MEMORY CHANNEL

BACKGROUND

Rootkits, spyware, and malware operate on the premise of hiding themselves from detection by security software executing on the same platform. Once a rootkit is able to hide itself on the platform, the rootkit can then observe all user activity, capture user data, perform circumvention of user actions, and other malicious activities. There are an increasing number of incidents of rootkits, spyware and malware that hide themselves from the user and execute in the background collecting sensitive information and slowing down the system considerably

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
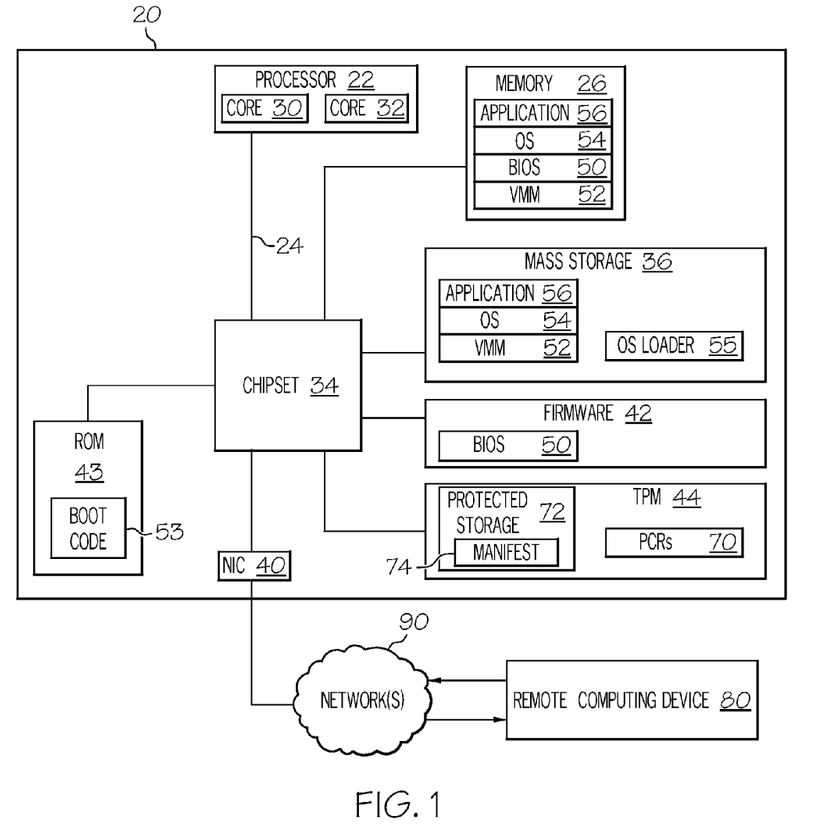
FIG. 1 shows an embodiment of a computing device.

Referring now to FIG. 1, an embodiment of a computing device 20 is shown. The computing device 20 may include a processor 22 communicatively coupled to various other components via one or more system buses 24 or other communication pathways or mediums. For example, the processor 22 may be communicatively coupled to one or more volatile or nonvolatile data storage devices such as memory 26, firmware device 42, a ROM (read only memory) device 43, and mass storage devices 36. Suitable storage devices 36 may include, without limitation, hard disk drives, floppy disk drives, optical disk drives, tapes, flash memory, memory sticks, digital video disks, phase change memory (PCM), etc. The processor 22 may also be communicatively coupled to one or more video controllers, integrated drive electronics (IDE) controllers, small computer system interface (SCSI) controllers, universal serial bus (USB) controllers, input/output (I/O) ports, input devices, output devices such as a display, etc.

As shown, the processor 22 may include one or more processing cores 30, 32. Alternatively, a computing device 20 may include a single processor 22 with a single processing core 30, or multiple processors 22 that each have at least one processing core 30. Moreover, one or more processing cores 30, 32 may provide multithreading support technologies such simultaneous multithreading (SMT), thus enabling each processing core 30, 32 to execute multiple threads simultaneously or substantially simultaneously.

The computing device 20 may also include a trusted platform module (TPM) 44. The TPM 44 may include control logic, platform configuration registers (PCR) 70, and protected storage 72. The TPM 44 may (a) store a measurement of the system configuration (e.g., a hash of the system configuration) in PCRs 70, (b) provide verified evidence of the system configuration (e.g., a signed configuration measurement), and (c) restrict access to protected digital keys, based at least in part on whether a current system configuration matches a predetermined approved configuration. The protected storage 72 in one embodiment may store a manifest 74 for the OS loader 55 and/or other components of the computing device 20. In one embodiment, a technician may remotely provision the manifest 72 using Intel® Active Management Technology (AMT). However, it should be appreciated that other mechanisms may be used to store the appropriate manifest(s) 74 into the protected storage 72. The manifest 74 comprises a white list of expected measurements for components of the computing device 20.

The TPM 44 may be implemented as a discrete module that is communicatively coupled to the processor 110 via a chipset 34 or other intermediate modules. Alternatively, some or all of the control logic, PCRs 70, and protected storage 72 of a trusted platform module 44 may be implemented as part of one or more other components (e.g., a NIC, an I/O controller, an I/O hub, a processor, etc.). In the embodiment of FIG. 1, the TPM 44 is shown as a discrete module that is communicatively coupled to processor 22 via chipset 34. The chipset 34 may include one or more bridges or hubs for communicatively coupling system components, as well as other logic and storage components.

The computing device 20 may be controlled, at least in part, by input from conventional input devices, such as a keyboard, a mouse, etc., and/or by directives received from another machine, biometric feedback, or other input sources or signals. The computing device 20 may utilize one or more connections to one or more remote computing devices 80, such as through NIC 40, a modem, or other communication ports or couplings. The computing devices 20, 80 may be interconnected to form a data processing environment through use of a physical and/or logical network 90, such as a local area network (LAN), a wide area network (WAN), an intranet, the Internet, etc. Communications involving the network 90 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

The memory 26, storage device 36, firmware 42, and ROM 43 may store software/firmware components which may be executed by processor 22. In particular, the firmware device 42 may store Basic Input/Output System (BIOS) code 50, and the ROM may store a system boot loader 53 to measure and verify the firmware of the firmware device 42. Furthermore, the mass storage 36 may store a virtual machine monitor (VMM) or hypervisor 52, one or more operating systems (OS) 54, an OS boot loader 55 to boot the OS 54, and one or more applications 56. The computing device 20 may transfer instructions of the BIOS code 50, virtual machine monitor 52, operating systems 54, and applications 56 to the memory 26 and execute such instructions with the processor 22.

In some embodiments, the memory 26 may organize content stored therein into a number of groups of memory locations. These organizational groups, which may be fixed and/or variable sized, may facilitate virtual memory management. The groups of memory locations may be pages, segments, or a combination thereof. Virtual memory using paging may facilitate emulation of a large logical/linear address space with a smaller physical memory. Therefore, the computing device 20 may provide a virtual execution environment in which software and/or firmware components may operate and may be mapped to physical pages of the memory 26. Page tables maintained by the OS 54 and/or the VMM 52 may map logical/linear addresses to physical address of the memory 26.

Figure 2:
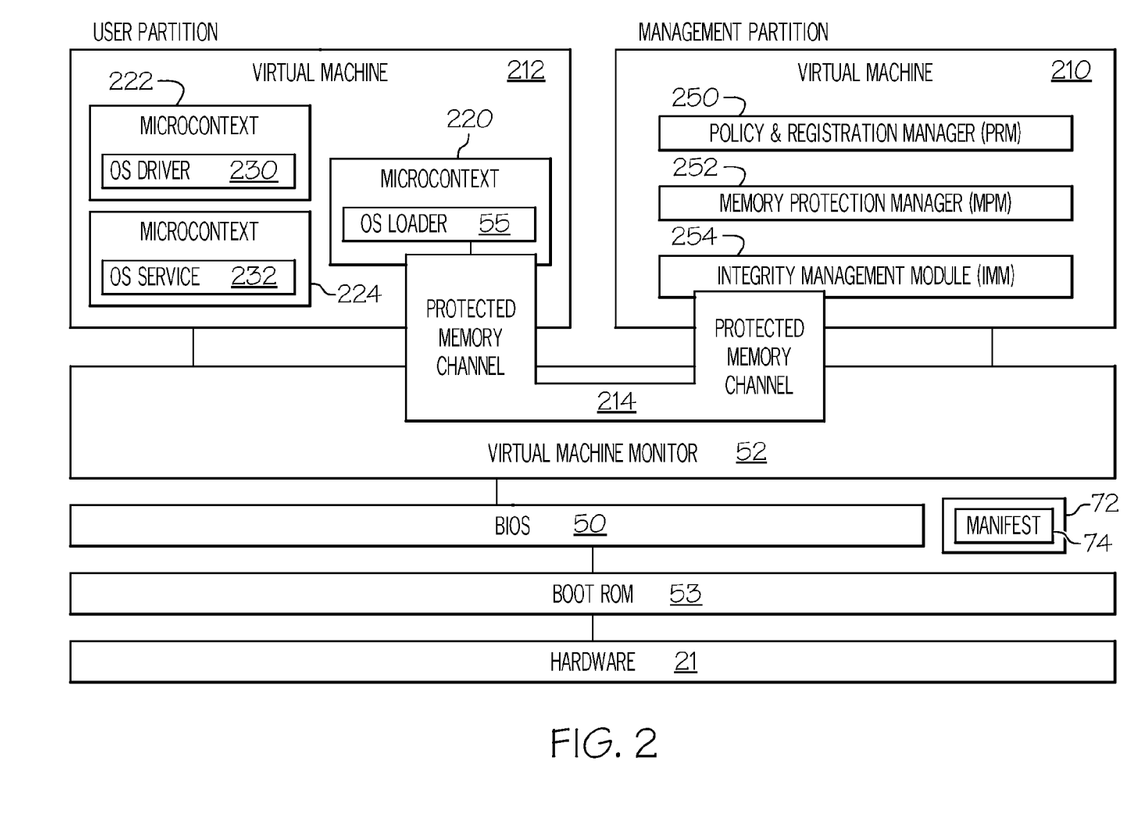
FIG. 2 shows an embodiment of a runtime environment that may be established upon the computing device of FIG. 1.

Referring now to FIG. 2, an embodiment of a runtime environment 200 is shown. In particular, FIG. 2 shows the relationship between various software/firmware components of the runtime environment 200 and the hardware 21 of computing device 20. As shown, the runtime environment 200 includes the system boot code 53, BIOS 50, VMM 52 and virtual machines 210, 212. The system boot code 53, BIOS 50, and VMM 52 in one embodiment establish a transitive chain of trust in which each layer measures and verifies the next layer to ensure the integrity of the runtime environment. In particular, the system boot code 53 measures and verifies the BIOS 50. The BIOS 50 measures and verifies the VMM 52. Furthermore, as explained in more detail below, the VMM 52 may establish a first virtual machine 210 to be used as a management partition and a second virtual machine 212 to be used as a user partition. The VMM 52 may also establish a protected memory channel 214 between an OS loader 55 of the user partition 212 and integrity services of the management partition 210 in order to measure, verify and execute components of the user partition in microcontexts 220.

In some embodiments, the computing device 20 may sequester software/firmware components of the computing device 20 to separate microcontexts of a virtual machine 210, 212. A microcontext may sequester a component, either physically or virtually, from other components executing within a virtual machine 210, 212. Microcontexts may facilitate insulation of a component such as, for example, OS driver 230 from another component such as, for example, OS service 232 of the virtual machine 210 without requiring the two components to operate in separate virtual machines. Microcontexts may also afford a component executing therein a level of protection from other components executing within the virtual machine that may be compromised in some manner such as, for example, by malware, critical runtime failures, etc.

The VMM 52 may present multiple abstractions and/or views of the hardware 21 of the computing device 20 (e.g. processor 22, memory 26, mass storage 36, network interface controller 40, etc.) to the virtual machines 210, 212. Moreover, each virtual machine 210, 212 may execute components independently and securely isolated from other virtual machines. Thus, the VMM 52 via the established virtual machines 210, 212 may prevent components of the user partition 212 from performing operations that would alter, modify, read, or otherwise affect the components of the management partition 210. Similarly, the VMM 52 may prevent components of the management partition 210 from performing operations that would alter, modify, read, or otherwise affect the components of the user partition 212. While two virtual machines or partitions are shown in FIG. 2, other embodiments may employ any number of virtual machines.

The components operating in the user partition 212 and the management partition 210 may each operate as if they were running on a dedicated computing device 20 rather than a virtual machine. That is, components operating in the user partition 212 and the management partition 210 may each expect to control various events and have complete access to the hardware 21. The VMM 52 may manage VM access to the hardware 21. The VMM 52 may be implemented in software (e.g., as a stand-alone program and/or a component of a host operating system), hardware, firmware, and/or any combination thereof.

As shown, the management partition 210 may include a policy and registration manager (PRM) 250, a memory protection manager (MPM) 252, and an integrity management module (IMM) 254. In another embodiment, the PRM 250, MPM 252 and the IMM 254 may be incorporated into the VMM 52. In such an embodiment, the protected memory channel 214 may be established between the user partition 212 and the VMM 52 instead of between the user partition 212 and the management partition 210. In fact, some embodiments may eliminate the management partition 210 all together. In yet another embodiment, one or more of the PRM 250, MPM 252 and IMM 254 may reside in the VMM 52, the management partition 210 and/or both the VMM 52 and management partition 210.

In one embodiment, a manifest 74 comprising expected values for software/firmware components of the computing device 20 may be registered with the PRM 250. Events pertaining to operation and setup of the protected memory channel 214 may be reported externally to an administration console. In one embodiment, a virtual machine that is accessible to an administrator may host the administration console. It should be noted that in one embodiment the management partition 210 may be hidden or otherwise inaccessible to an administrator. In another embodiment, instead of hosting the administration console via another virtual machine, Active Management Technology (AMT) and a management engine of the chipset 34 may support management of the manifest 74 and provisioning, logging and event handling via a remote computing device 80.

The MPM 252 may receive events resulting from accesses to pages of microcontexts. The MPM 252 may determine based upon an access policy if the attempted access to the pages of the microcontext is acceptable. Thus, the MPM 252 may help protect components executed within microcontexts from various malware.

The IMM 254 may verify components of the computing device 20 based upon manifests 74 registered with the PRM 250. In one embodiment, the IMM 254 may search for the component directly in the memory 26 via direct memory accesses (DMA). In various embodiments, the linear address of the component may be provide to the IMM 254 and the IMM 254 may generate a measurement of the component. In one embodiment, the IMM 254 may generate a cryptographic hash of the component to obtain a measurement of the component and may compare the obtained measurement to an expected measurement provided by the manifest 74. If the generated measurement differs from the expected measurement, the IMM 254 may determine that the integrity of the component is not valid and may signal the VMM 52 accordingly.

Figure 3:
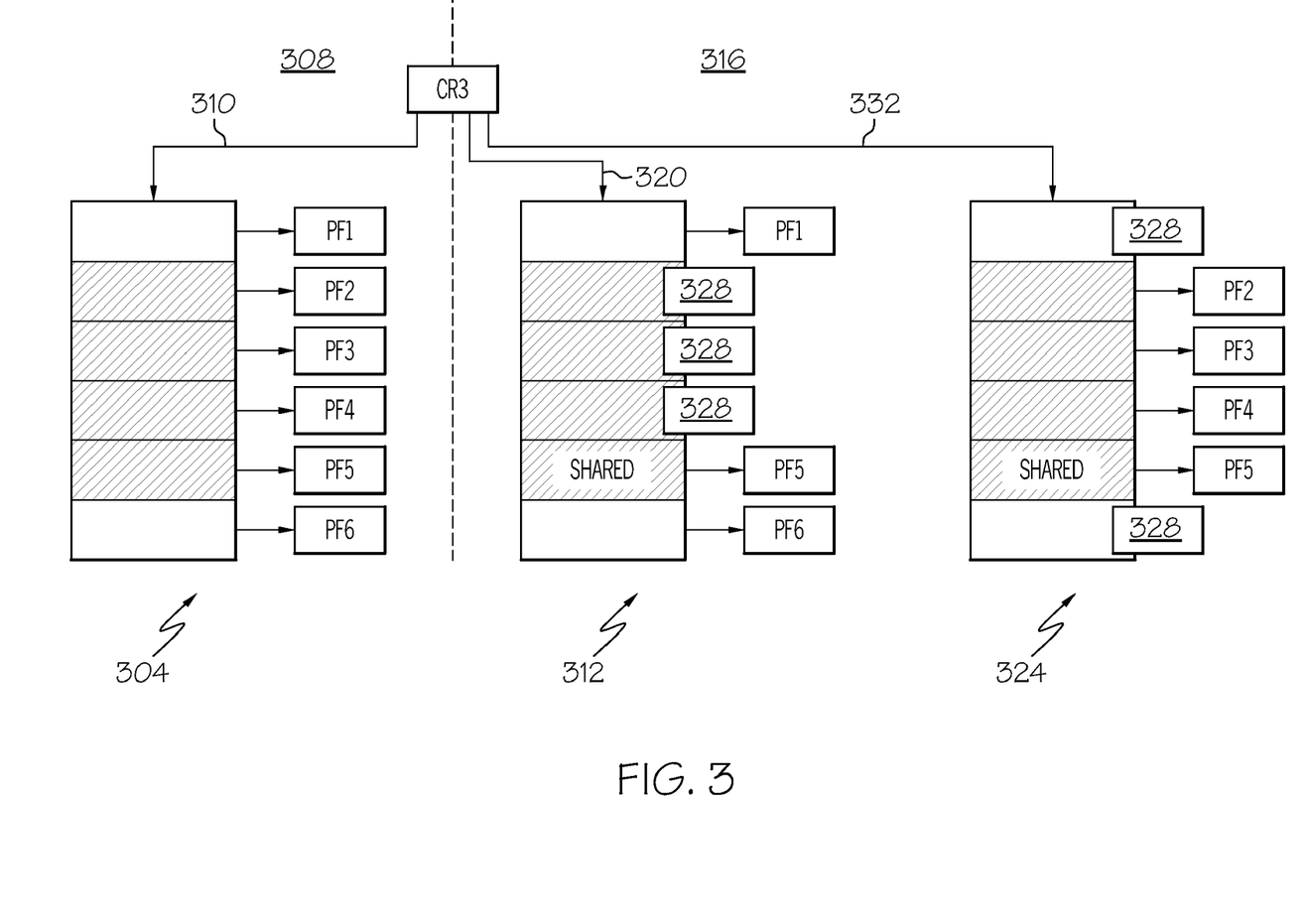
FIG. 3 shows an embodiment of a guest page table, active page table and protected page table that may be used by the runtime environment of FIG. 2.
Figure 4A:
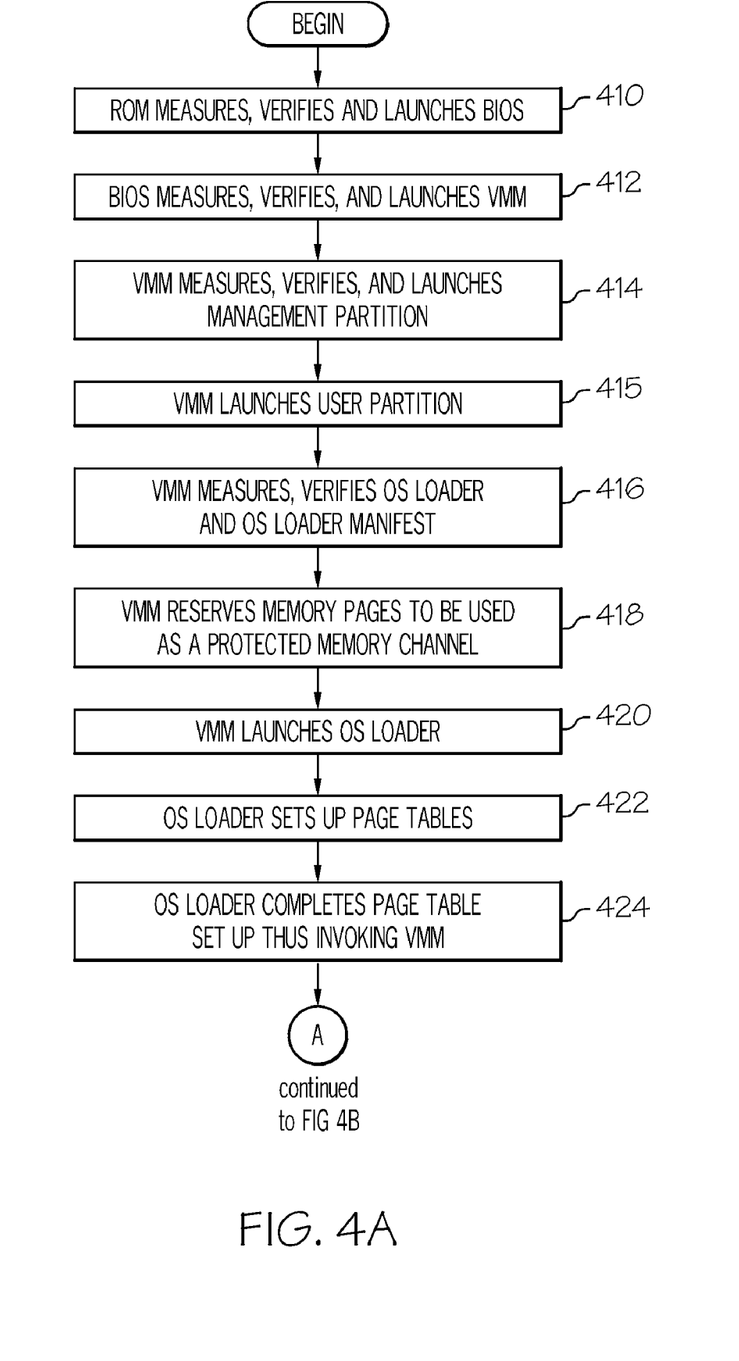
FIGS. 4A-4B show an embodiment of a process to establish a protected memory channel between a user partition and a management partition of the runtime environment of FIG. 2.
Figure 4B:
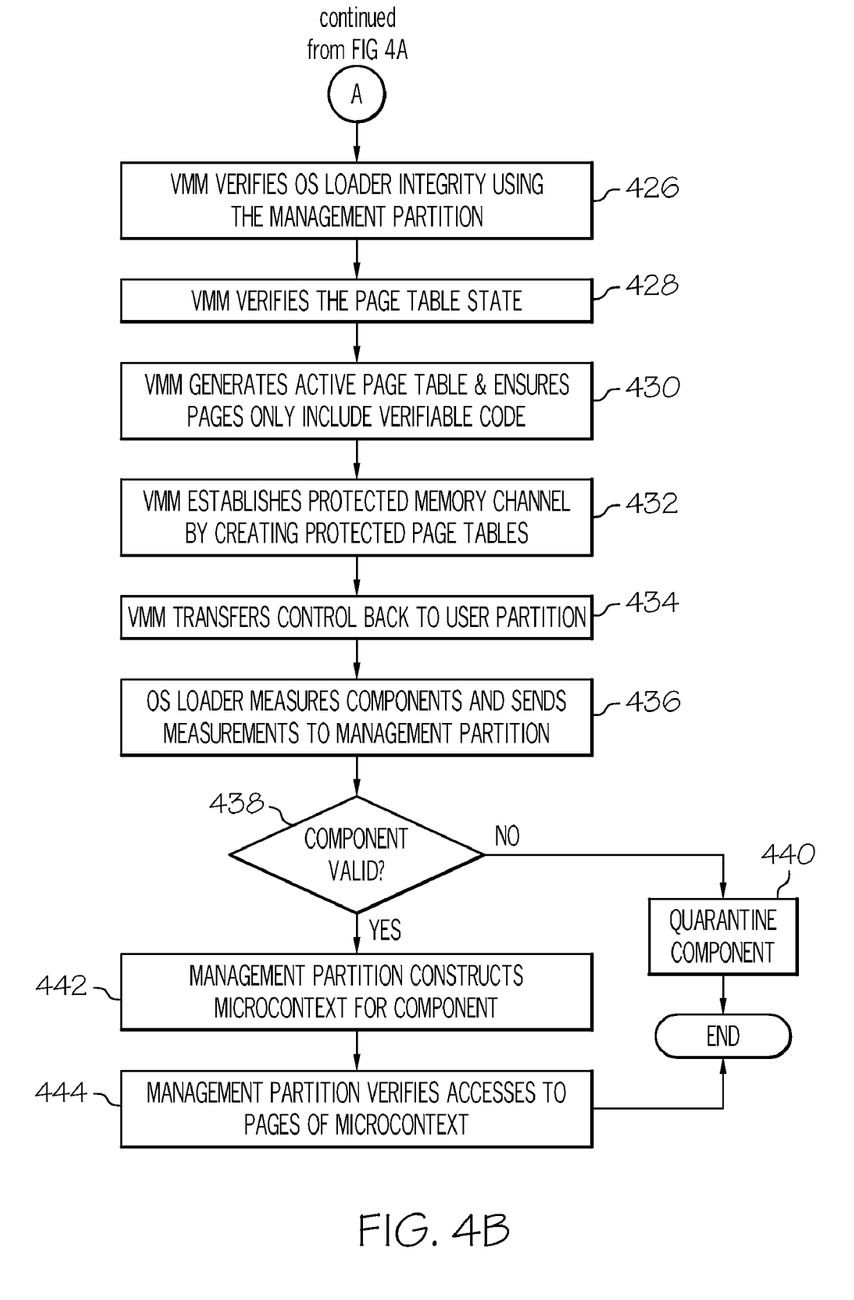

Additional details regarding the runtime environment 200 will be discussed below in regard to the protected memory channel process of FIGS. 4A-4B. However, in order to better understand the protected memory channel process of FIGS. 4A-4B, a brief discussion regarding page table management is warranted. Turning now to FIG. 3, there is depicted a guest page table (GPT) 304 in an OS domain 308. The OS 54 may create a GPT 304 in order to map linear addresses of components executing in the user partition 212 to physical addresses of the memory 26. For example, a component (e.g. OS loader 55) may be set to occupy the $2^{nd}$ through the $5^{th}$ page table entries (PTEs), which refer to page frames having active content. The VMM 204 may monitor and trap control register pointer (e.g. CR3) changes that are associated with the GPT 304 and/or PTEs. For example, when the OS 54 creates a GPT 304 and provides a CR3 value 310 to the GPT 304, the VMM 52 may trap on the CR3 change, may create an active page table (APT) 312 which may be a duplicate copy of the GPT 304 in the VMM domain 416, and may change the CR3 value 310 to value 320 pointing to the APT 312. In this way, the VMM 52 may coordinate accesses to the memory 26 from a number of VMs, e.g. user partition 212 and management partition 210.

The VMM 52 may also create a protected page table (PPT) 324 for a microcontext 220. The VMM 52 may copy the page frames having the active content (e.g. PF2-PF5) into the PPT 324 and may assign the page table entries (PTEs) that do not refer to those page frames (e.g. PF1 and PF6) with access characteristics 328 to cause a page fault upon execution. In various embodiments, the access characteristics 328 may be 'not present', 'execute disabled,' and/or read-only. In an embodiment, the access characteristics 328 may be 'not present' or a combination of 'execute disable' and read-only to prevent unauthorized modifications to the active content.

As mentioned above in regard to FIG. 2, the computing device 20 may use virtual machine technologies to create a management partition 210 and one or more user partitions 212. Furthermore, the computing device 20 may execute a runtime memory protection process to establish a protected memory channel 214 between integrity services of the management partition 210 and an operating system (OS) loader 55 of a user partition 212. To this end, the runtime memory protection process may securely transfer runtime measurements performed by the OS loader 55 to a VMM 52 of the computing device 20 or to one or more management VMs 210 of the computing device 20. In one embodiment, the runtime memory protection process may dynamically create a microcontext 220 for an OS loader 55 of the OS 54, create a microcontext 222 for an OS driver 230 of the OS 54, create a microcontext 224 for an OS service 232 of the OS 54, and/or create microcontexts for other components executing within the user partition 212 and/or the management partition 210.

The runtime memory protection process may also populate microcontexts with code whose integrity has been verified according to a white list of values before such code is permitted to execute. The runtime memory protection process may also ensure that a rootkit, spyware or other malware code is not lurking in stored program images and may prevent such malware code from being executed. In this manner, the runtime memory protection process may protect verified code from infection from network worms and other malware that might dynamically install rootkit code or otherwise compromise verified code of the computing device.

Further details regarding one embodiment of a runtime memory protection process will be explained with reference to FIGS. 4A-4B. As is common practice in the software industry, the following explanation of the runtime memory protection process indicates various software and/or firmware of the computing device 20 such as ROM code 53, BIOS code 50, virtual machine monitor 52, operating system 54, applications 56 and components thereof as performing various operations. However, one skilled in the art should readily recognize that such software and/or firmware components do not in fact perform such actions, but instead such actions are performed by the computing device 20 in response to executing instructions of such software and/or firmware components.

At block 410, the system boot ROM code 53 may measure, verify and launch the BIOS code 50 to ensure that the BIOS code 50 has not been altered. The ROM code 53 may extend PCRs 70 of the TPM 44 based upon the obtained measurements. The ROM code 53 may perform a similar process if the computing device 20 includes Extended Firmware Interface (EFI) firmware instead of legacy BIOS code 50. Similarly, the BIOS code 50 at block 412 may measure, verify and launch the VMM 52 to ensure that the VMM 52 has not been altered. The BIOS code 50 may also extend PCRs 70 of the TPM 44 based upon the measurement of the VMM 52.

At block 414, the VMM 52 may measure, verify and launch the management partition 210 and may extend PCRs 70 of the TPM 44 accordingly. In one embodiment, the VMM 52 may further measure, verify and launch integrity services of the management partition 210 and may extend PCRs 70 accordingly. In particular, the VMM 52 may measure, verify and launch a registration manager 250, a memory protection manager 252, and an integrity management module 254. At block 415, the VMM 52 may measure, verify and launch the user partition 212 and may extend PCRs 70 of the TPM 44 accordingly.

After establishing the management partition 210 and the integrity services therein, the VMM 52 at block 416 may measure and verify the OS loader 55 for the OS 54 to be executed by the user partition 212, and may measure and verify a manifest 74 for the OS loader 55. In one embodiment, a technician may provision and store a separate manifest 74 for each OS 54 and associated OS loader 55 in the protected storage 72 of the TPM 44. The manifest 74 includes expected measurements for the OS loader 55 and any other components of the OS 54 that are to granted access to the protected memory channel 214.

At block 418, the VMM 52 may reserve pages of the memory 26 to be used as the protected memory channel 214 for the OS loader 55 after the OS loader 55 and possibly associated OS services 232 have been verified and place in respective microcontexts 220, 232. In one embodiment, the VMM 52 may reserve the pages as a memory-mapped IO space and report the reserved pages to the OS loader 55 as an unknown PCI (Peripheral Component Interconnect) device space. Reporting the reserved pages as an unknown PCI device space provides a simple mechanism for ensuring that the OS loader 55 does not use the reserved pages for other purposes. Typical OS design is to not allocate pages associated with unknown PCI device space to the memory pool of the OS 54, thus essentially reserving such pages for other purposes. Alternatively, the VMM 52 may reserve the pages by determining the size of the data section for the OS loader 54 and any OS service 55 that are to access the protected memory channel 214, and use page table mappings to remap the data sections of the OS loader 54 and any OS service 55 in the VMM 52 in order to provide such data sections with access to the protected memory channel 214.

After measuring and verifying the OS loader 55 and its manifest 74 and reserving memory pages for the protected memory channel 214, the VMM 52 at block 420 may launch the OS loader 55 in the user partition 212. At block 422, the OS loader 55 may set up paged and non-paged areas of the memory 26 for the OS 54 to be launched in the user partition 212. In one embodiment, the OS loader 55 may set up the paged and non-paged areas in a guest-real mode of a non-64 bit addressing environment. In such an environment, the OS loader 55 may execute in a flat physical address space. In another embodiment, the OS loader 55 may set up the paged and non-paged areas in a long-mode of a 64-bit addressing environment. In such an environment, the OS loader 55 may execute in a 1:1 paged mode as set up by the BIOS code 50 and/or the VMM 52 before launching the OS loader 55. In either case, the OS loader 55 sets up page tables as required by its associated OS 54 without turning paging on in the non-64 bit addressing environment or without changing the 1:1 mapping of the 64 bit addressing environment. In one embodiment, the OS loader 55 only loads other code such as, for example, OS services 232 and OS drivers 230 for which measurements have been included in the manifest 74. Moreover, the VMM 52 and/or OS loader 55 ensure that the OS loader 55 and other code of the OS 54 are loaded at known offsets so that such code may be unambiguously verified as explained below.

After the OS loader 55 sets up page tables as required by its associated OS 54, the OS loader 55 at block 424 may issue a call to the VMM 52. In one embodiment, the OS loader 55 initiates the hyper-call to the VMM 52 by writing to the CR3 register to point to the newly set up page tables for the OS 54. As described above, the VMM 52 traps changes to the CR3 control register.

At block 426, the VMM 52 via the IMM 254 of the management partition 254 may determine whether integrity of the OS loader 55 and any other loaded code (e.g. OS services 232, OS drivers 234) is still valid. As mentioned above, the IMM 254 may determine whether the OS loader 55 and other loaded code is valid based upon a manifest 74 previously registered with the PRM 250. The VMM 52 may verify at block 428 that the current state of the GPTs 304 associated with the user partition 212 are as expected. In particular, the VMM 52 may verify that protected mode is off for the non-64 bit addressing environment or that flat mapping is enabled for the 64 bit addressing environment.

At block 430, the VMM 52 may map the changes to the GPTs 304 to APTs 312 after verifying the current state of the GPTs 304 and may verify the GPTs 304 setup by the OS loader 55 only contain code associated with expected measurements of the manifest 74. In particular, the VMM 52 ensures that the only code currently loaded by the user partition 212 may be verified by the IMM 254 via the associated manifest 74.

The VMM 52 at block 432 may generate a PPT 324 for the OS loader 55 and other loaded code which has been verified by the IMM 254. By verifying the OS loader 55, other code, and various page tables, the creation of the PPT 324 establishes a secure communications channel or protected memory channel 214 between the OS loader 55 and the integrity services of the management partition 210.

After establishing the protected memory channel 214, the VMM 52 at block 434 may transfer control back to the user partition and the OS loader 55. The OS loader 55 may continue launching other services such as OS services 232 with paging turned on in the user partition 212. In particular, the OS loader 55 at block 436 may measure each component and send such measurements to the IMM 254 of the management partition 210 via the protected memory channel 214. The IMM 254 at block 438 may verify the component based upon such measurements received from the OS loader 55 and a manifest 74 previously registered with the PRM 250 and may inform the OS loader 55 via the protected memory channel 214 whether the integrity of the component is valid. If the integrity of the component is not valid, the OS loader 55 at block 440 may quarantine the component for later inspection and/or removal.

If the integrity of the component is valid, the PRM 250 of the management partition at block 442 may dynamically construct microcontexts 222, 224 in which the user partition 212 may execute verified components. In particular, the IMM 254 may provide the PRM 250 with addresses for memory pages occupied by the verified component OS loader 55 and the PRM 250 may register such address with the VMM 52 so that the VMM 52 may created PPTs 324 for such memory pages. As a result of creating such PPTs 324, accesses to the pages of the microcontexts 220, 222, 224 are trapped as explained above.

The trapped pages may generate events with the MPM 252. The MPM 252 at block 444 may determine based upon an access policy if the attempted access to the pages of the microcontext is acceptable. Thus, the MPM 252 may help protect the OS loader 54, OS drivers 230, OS services 232 and possibly other components executed within microcontexts from various malware.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method, comprising:
retrieving, by a computing device, a manifest stored in protected storage of the computing device, wherein the manifest comprises an expected measurement for an operating system loader;
measuring and verifying, by the computing device, integrity of a virtual machine monitor of the computing device;
launching, by the computing device, via the virtual machine monitor, one or more integrity services;
launching, by the computing device, via the virtual machine monitor, a user partition to execute the operating system loader;
establishing, by the computing device, a protected memory channel between the launched one or more integrity services and the operating system loader of the user partition;
measuring and verifying, by the computing device, the operating system loader, with the launched one or more integrity services, via the protected memory channel, wherein the measuring and verifying is based at least in part upon the expected measurement of operating system loader in the manifest; and
after successfully measuring and verifying the OS loader, launching, by the computing device, via the virtual machine monitor, the OS loader in the user partition.

2. The method of claim 1, wherein launching the one or more integrity services comprises launching one or more integrity services provided by the virtual machine monitor.

3. The method of claim 1, wherein launching the one or more integrity services comprises launching via the virtual machine monitor a management partition within which to execute the one or more integrity services.

4. The method of claim 3, further comprising:
measuring, by the computing device, a service of the operating system with the operating system loader, wherein the manifest further comprises an expected measurement for the service;
sending, by the computing device, a measurement of the service from the operating system loader to the one or more integrity services of the management partition using the protected memory channel; and
verifying, by the computing device, integrity of the service with the one or more integrity services of the management partition based upon an expected measurement for the service provided by the manifest.

5. The method of claim 4, further comprising:
constructing, by the computing device, a microcontext in which to execute the service in response to the one or more services of the management partition verifying the integrity of the service.

6. The method of claim 5, further comprising:
registering, by the computing device, addresses occupied by the service in the microcontext with the virtual machine monitor to generate an event in response to accesses to the addresses occupied by the service; and
enforcing, by the computing device, an access policy with one or more services of the management partition in response to an occurrence of the event.

7. The method of claim 1 further comprising:
measuring, by the computing device, a plurality of services of the operating system with the operating system loader;
sending, by the computing device, measurements of the plurality of services from the operating system loader to the one or more integrity services using the protected memory channel; and
verifying, by the computing device, integrity of the plurality of services with the one or more integrity services based upon expected measurements for the plurality of services provided by the manifest.

8. The method of claim 1 wherein establishing the protected memory channel comprises:
verifying, by the computing device, with the one or more integrity services, that a page table created by the operating system loader defines pages having only services of the operating system for which the manifest has expected measurements;
creating, by the computing device, an active page table for pages of the user partition that do not contain services that are to access the protected memory channel; and
creating, by the computing device, a protected page table for pages of the user partition that do contain services that are to access the protected memory channel.

9. A non-transitory machine readable storage medium comprising a plurality of instructions that, in response to being executed by a computing device, result in the computing device performing operations including:
retrieving a manifest from protected storage of the computing device, wherein the manifest comprises an expected measurement for an operating system loader;
measuring and verifying integrity of a virtual machine monitor;
launching, via the virtual machine monitor, a management partition to execute one or more integrity services;
launching, via the virtual machine monitor, a user partition to execute the operating system loader;
establishing a protected memory channel between the launched one or more integrity services of the management partition and the operating system loader of the user partition;
measuring and verifying the operating system loader with the launched one or more integrity services, via the protected memory channel, wherein the measuring and verifying is based at least in part upon the expected measurement of the operating system loader in the manifest; and
after successfully measuring and verifying the OS loader, launching, via the virtual machine monitor, the OS loader in the user partition.

10. The storage medium of claim 9, wherein the operations further include:
measuring a service of the operating system with the operating system loader, wherein the manifest further comprises an expected measurement of the service;
sending a measurement of the service from the operating system loader to the one or more integrity services of the management partition using the protected memory channel; and
verifying integrity of the service with the one or more integrity services of the management partition based upon the expected measurement for the service provided by the manifest.

11. The storage medium of claim 10, wherein the operations further include:
constructing a microcontext in which to execute the service in response to the one or more services of the management partition verifying the integrity of the service.

12. The storage medium of claim 11, wherein the operations further include:
registering addresses occupied by the service in the microcontext with the virtual machine monitor to generate an event in response to accesses to the addresses occupied by the service; and
enforcing an access policy with one or more services of the management partition in response to an occurrence of the event.

13. The storage medium of claim 9, wherein the operations further include:
measuring a plurality of services of the operating system with the operating system loader;
sending measurements of the plurality of services from the operating system loader to the one or more integrity services of the management partition using the protected memory channel; and
verifying integrity of the plurality of services with the one or more integrity services of the management partition based upon expected measurements for the plurality of services provided by the manifest.

14. The storage medium of claim 9, wherein the operations further include:
verifying with the virtual machine monitor that a page table created by the operating system loader defines pages having only services of the operating system for which the manifest has expected measurements;
creating an active page table for pages of the user partition that do not contain services that are to access the protected memory channel; and
creating a protected page table for pages of the user partition that do contain services that are to access the protected memory channel.

15. A computing device, comprising:
protected storage configured to store a manifest having an expected measurement for an operating system loader;
read-only memory configured to store code to measure and verify integrity of firmware;
firmware configured to measure and verity integrity of a virtual machine monitor;
a storage device configured to store the virtual machine monitor and an operating system having an operating system loader, wherein the virtual machine monitor is configured to launch a management partition to execute one or more integrity services, to launch a user partition to execute the operating system loader, to establish a protected memory channel between the launched one or more integrity services of the management partition and the operating system loader of the user partition, to measure and verify the operating system loader with the launched one or more integrity services, via the protected memory channel, wherein the measure and verify is based at least in part upon the expected measurement of the operating system loader in the manifest, and, after successfully measure and verification of the OS loader, to launch, via the virtual machine monitor, the OS loader in the user partition; and
a processor configured to execute the code of the read only memory, the firmware, the virtual machine monitor, the operating system, the operating system loader, the management partition, and the user partition.

16. The computing device of claim 15, wherein:
the operating system loader is configured to measure a service of the operating system with the operating system loader, and to send a measurement of the service to the one or more integrity services of the management partition using the protected memory channel, in response to being executed by the processor; and
the management partition is configured to verify the service, via the one or more integrity services, based upon an expected measurement for the service provided by the manifest, in response to being executed by the processor.

17. The computing device of claim 16, wherein:
the operating system loader is configured to measure a plurality of services of the operating system, is to send measurements of the plurality of services to the one or more integrity services of the management partition using the protected memory channel, in response to being executed by the processor; and
the management partition is configured to verify integrity of the plurality of services based upon expected measurements for the plurality of services provided by the manifest, via the one or more integrity services, in response to being executed by the processor.

18. The computing device of claim 16, wherein the virtual machine monitor is configured to verify that a page table created by the operating system loader defines pages having only services of the operating system for which the manifest has expected measurements, to create an active page table for pages of the user partition that do not contain services that are to access the protected memory channel, and to create a protected page table for pages of the user partition that do contain services that are to access the protected memory channel, in response to being executed by the processor.

19. The computing device of claim 15, wherein, the management partition is configured to construct a microcontext in which to execute the service in response to verifying the integrity of the service via the one or more integrity services, in response to being executed by the processor.

20. The computing device of claim 19, wherein:
the management partition is configured to register addresses occupied by the service in the microcontext with the virtual machine monitor via the one or more integrity services, in response to being executed by the processor;
the virtual machine monitor is configured to update a page table to generate an event in response to accesses to the addresses occupied by the service, in response to being executed by the processor; and
the management partition is configured to enforce an access policy, via the one or more integrity services, responsive to an occurrence of the event, in response to being executed by the processor.

* * * * *